US007664580B2

(12) United States Patent
Popp et al.

(10) Patent No.: US 7,664,580 B2
(45) Date of Patent: Feb. 16, 2010

(54) METHOD FOR OPERATING DRIVE TRAIN SIDE COMPONENTS OF A MOTOR VEHICLE

(75) Inventors: Christian Popp, Kressbronn (DE); Georg Gierer, Kressbronn (DE); Thilo Schmidt, Meckenbeuren (DE); Klaus Steinhauser, Kressbronn (DE); Peter Schiele, Kressbronn (DE); Bernd Allgaier, Kressbronn (DE); Christian Schwemer, Friedrichshafen (DE); Ruben Cüppers, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 379 days.

(21) Appl. No.: 11/581,907

(22) Filed: Oct. 17, 2006

(65) Prior Publication Data

US 2007/0085497 A1 Apr. 19, 2007

(30) Foreign Application Priority Data

Oct. 19, 2005 (DE) ....................... 10 2005 050 005

(51) Int. Cl.
*G06F 19/00* (2006.01)
*G06F 7/00* (2006.01)
*G01M 15/00* (2006.01)

(52) U.S. Cl. ............................. 701/29; 701/33; 701/53; 701/115

(58) Field of Classification Search ..................... 701/1, 701/31, 32, 35, 29, 51, 53, 54, 55, 58, 67, 701/68, 114, 115; 477/34, 43
See application file for complete search history.

(56) References Cited

U.S. PATENT DOCUMENTS

| | | | | |
|---|---|---|---|---|
| 5,327,052 | A * | 7/1994 | Sakurai et al. | 318/400.21 |
| 5,497,741 | A * | 3/1996 | Tashiro et al. | 123/192.1 |
| 6,230,092 | B1 | 5/2001 | Becker et al. | |
| 2001/0027524 | A1 | 10/2001 | Krauter et al. | |
| 2006/0143472 | A1 | 6/2006 | Feilen et al. | |

FOREIGN PATENT DOCUMENTS

| | | | |
|---|---|---|---|
| DE | 296 18 851 | U1 | 2/1997 |
| DE | 196 15 806 | A1 | 10/1997 |
| DE | 198 49 329 | A1 | 4/2000 |
| DE | 199 39 814 | A1 | 2/2001 |
| DE | 199 63 208 | A1 | 7/2001 |
| DE | 102 38 095 | A1 | 3/2004 |

* cited by examiner

*Primary Examiner*—Edward Pipala
(74) *Attorney, Agent, or Firm*—Davis & Bujold, P.L.L.C.

(57) ABSTRACT

A method for operating power train side components of a motor vehicle. Using a control device of a motor, at least one motor parameter is issued and delivered via a databus to at least one control device of one other power drive side component working independently of the motor control device in order to operate all or each one of the power drive side components dependent. in a first inventive aspect, a behavior of the respective other power drive side components that adjusts itself according to the motor torque actually made available by the motor is evaluated. In second inventive aspect, the motor torque issued by the motor control device is compared with a torque stored according to motor operation parameters in the control device working independently of the motor control device.

12 Claims, 1 Drawing Sheet

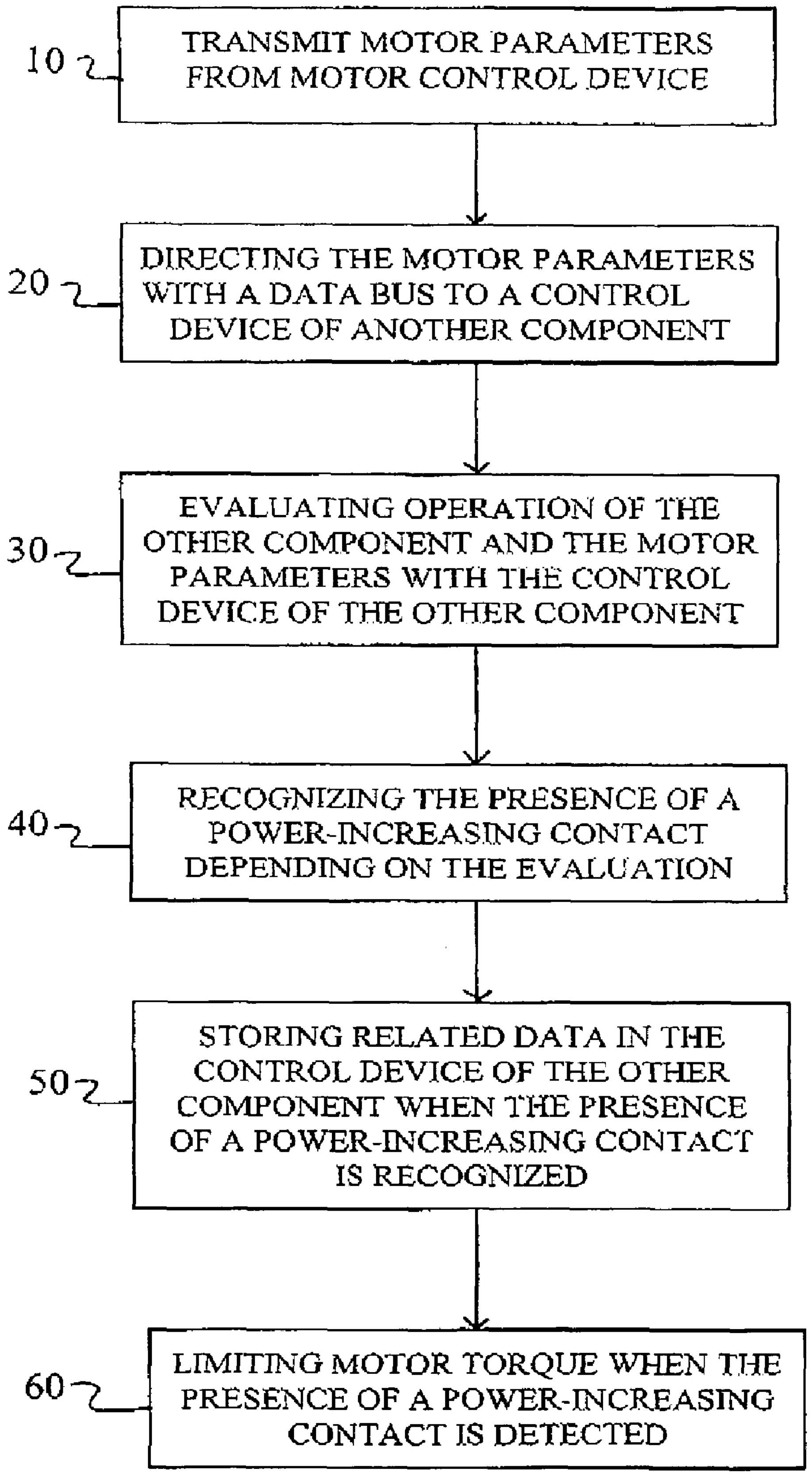
10
TRANSMIT MOTOR PARAMETERS FROM MOTOR CONTROL DEVICE
20
DIRECTING THE MOTOR PARAMETERS WITH A DATA BUS TO A CONTROL DEVICE OF ANOTHER COMPONENT
30
EVALUATING OPERATION OF THE OTHER COMPONENT AND THE MOTOR PARAMETERS WITH THE CONTROL DEVICE OF THE OTHER COMPONENT
40
RECOGNIZING THE PRESENCE OF A POWER-INCREASING CONTACT DEPENDING ON THE EVALUATION
50
STORING RELATED DATA IN THE CONTROL DEVICE OF THE OTHER COMPONENT WHEN THE PRESENCE OF A POWER-INCREASING CONTACT IS RECOGNIZED
60
LIMITING MOTOR TORQUE WHEN THE PRESENCE OF A POWER-INCREASING CONTACT IS DETECTED

METHOD FOR OPERATING DRIVE TRAIN SIDE COMPONENTS OF A MOTOR VEHICLE

This application claims priority from German Application Serial No. 10 2005 050 005.6 filed Oct. 19, 2005.

FIELD OF THE INVENTION

The invention relates to a method for operating drive train side components of a motor vehicle.

BACKGROUND OF THE INVENTION

An increasing trend can be found that motor vehicle operators increase the power offered by a motor of a motor vehicle by power-increasing contacts or manipulations, such as so-called chip tuning, on a motor control device. By the so-called chip tuning, the torque made available by the motor is especially increased which constitutes, for example, an input parameter for a transmission of a motor vehicle. The chip tuning and the associated increase of motor power or of a torque made available by the motor can cause damages to the motor or also to other power drive side components of a motor vehicle such as the transmission, for example, since the power drive side components of the motor vehicle are operated outside layout limits. If these damages caused by power-increasing contacts or manipulations appear within the warranty period or security period, the expenses caused thereby are usually assumed either by the motor vehicle manufacturer or by suppliers of the power train side components, since the cause of the damage cannot be demonstrated or is demonstrated only with difficulty. Therefore, on the side of the motor vehicle manufacturers and on the side of the suppliers, there is need to detect an increase of the motor power produced, for example, by chip tuning, in order that warranty claims or security claims can be justified in case of damage of the motor vehicle caused by power-increasing contacts or manipulations.

In the case of power-increasing contacts or manipulations, a distinction must be made between tuning steps where, on one hand, by manipulation of the software implemented in a motor control device due to the power-increasing contact, the motor control device issues an increased motor torque signal (for example, as CAN signal) and where, on the other hand, despite the tuning steps conducted, the motor control device issues a non-increased nominal motor torque.

Departing to a first aspect of the instant invention this problem is solved by a method for operating power drive side components of a motor vehicle.

SUMMARY OF THE INVENTION

According to a first aspect of the invention, this problem is solved by a method for operating power drive side components of a motor vehicle. Accordingly, for detection of power increasing contacts in which the motor control device despite the power increase issues of a non-increased motor torque a behavior is evaluated of the respective other drive train side component that adjusts itself depending on the actual motor torque prepared by the motor on its crankshaft.

According to a second aspect of the instant invention, this problem is solved by a method for operating power train side components of a motor vehicle. Accordingly, to detect power increasing contacts in which the motor control device, due to the power increase, issues an increased torque, the nominal motor torque issued by the motor control device is compared with a torque stored, depending on motor operating parameters, in the control device that works independently of the motor control device.

Aided by the inventive method, power increases of the motor produced by power-increasing contacts or manipulations can be detected with certainty, namely on one hand, power increases in which the motor control device issues an increased motor torque and, on the other, power increases in which the motor control device, despite the power increasing contact, issues a non-increased motor torque. With the invention can be understood whether, due to the power increase of the motor, damages thereof or of other power drive side components have been produced so that in this case, for example, warranty claims or security claims can be justified. This information concerning power-increasing steps on the motor can obviously be used also for other purposes, such as for discovering contacts in the vehicle that are contrary to the law or official authorization (police, TUV, etc.) using an adequate data interface.

The detection of power-increasing contacts is preferably carried out in a control device of a transmission which works independently of the control device of the motor. Alternatively or additionally, such a detection can also be carried in other control devices like an ABS (anti-block system) or an ASR (anti-slip regulation).

BRIEF DESCRIPTION OF THE DRAWINGS the invention will now be described, by way of example, with reference to the accompanying drawings in which the sole FIGURE is a flow chart diagram of a method for operating power train side components of a motor vehicle.

DETAILED DESCRIPTION OF THE INVENTION

The invention concerns a method for operating power train side components of a motor vehicle, such as a motor, a transmission and optionally other components of the power train. The operation of a motor is regulated by a motor control device which issues motor parameters and makes them available on a so-called CAN databus.

In step 10, the motor parameters prepared by the motor control device are delivered to control devices of other drive train side components that work independently of the motor control device, such as a control device of a transmission; the control device operating the transmission on the basis of the motor parameters prepared by the motor control device.

On the motor control device, if power-increasing contacts or manipulations (i.e., a power increasing modification) are conducted, such as by so-called chip tuning, this can result in the motor, the same as other power train side components of the motor vehicle, are inadmissibly loaded causing damage to the parts or groups of parts. After damage of one or more power drive side components of the motor vehicle, if the power-increasing contact is made regressive, then a vehicle manufacturer or supplier cannot, or only with difficulty, demonstrate that the damages were caused by power-increasing contacts on the motor control or on the motor. Therefore, it is necessary to detect with certainty power-increasing contacts specifically, on one hand, contacts in which the motor control device despite the power-increasing issues a non-increased motor torque and, on the other, contacts in which the motor control device as a consequence of the power-increasing contact issues an increased motor torque.

To detect power-increasing contacts in which the motor control device, despite the power-increasing contact, issues a non-increased motor torque and makes it available in the databus, in conformity with the invention, it is proposed to evaluate a behavior that adjusts itself, depending on the motor torque actually prepared by the motor, of at least one power-drive side component different from the motor and, on the basis of this evaluation, recognize the power-increasing contacts.

In continuation, the point of departure must be that for detection of power-increasing contacts in a transmission control device, the behavior of an automatic transmission, such as a multi-step transmission or a continuously variable automatic transmission or a double-clutch transmission, is evaluated or monitored.

A motor of a vehicle, for example, by chip tuning of the motor control device, a power-increasing contact or a power-increasing manipulation is effected in which the motor control device, despite the contact, delivers via the CAN databus in step 20, a non-increased motor torque to the transmission control device then, for detection of the power-increasing contact, it can be examined in step 30 whether by the adaptations of control parameters made by the transmission control device run all in one direction, especially in direction of a pressure increase for a pressure control system of the transmission. If this is the case, then in step 40 the power-increasing contacts on the motor or the motor control device can be recognized, for in adaptations for compensating serial deviations adaptations of the control parameters usually are not all carried out in one direction.

Additionally or alternatively, it can be examined whether adaptations of control parameters made by the transmission control device result in strong or irregular changes of the control parameters, for example, in an irregular pressure increase in the pressure system of the transmission. If such irregular parameter adaptations exist, power-increasing contacts on the motor control device can also be recognized, since adaptations for compensating changes determined by aging always result in small steps.

Additionally or alternatively, it can be examined whether adaptations of control parameters by the transmission control device push to an upper power range of adaptation limits, whereas in a lower or middle power range, adaptations can still be effected within admissible limits. It is thus possible, for example, that the pressure height of the pressure control system in the upper power range can no longer be enough to adapt the transmission. If this is the case, then it is possible, in turn herefrom, to recognize power-increasing contacts.

It is further possible for detection of power-increasing contacts in which the motor control device despite a power increasing contact issues a non-increased motor torque to monitor errors which form during operation of the transmission control device. For all shifts, if a clearly correcting contact such as of the pressure regulating system of the transmission control is found, this can in turn be recognized herefrom power-increasing contacts on the motor and/or the motor control device.

It is, likewise, possible for detection of power-increasing contacts in which the motor control device despite a power-increasing contact issues to the CAN databus a non-increased motor torque to calculate in the transmission control device, on the basis of a pattern of the transmission or of a pattern of the power train, a theoretical motor torque which, taking into consideration the self-adjusting behavior or operation of the transmission, actually should be close. The theoretical motor torque can be compared with the torque issues by the motor control device and when the calculated motor torque deviates upward by a limit value from the torque issued by the motor control device, power increasing contacts can be recognized.

Let it be indicated here that based on a pattern of a transmission, for example, a static and/or dynamic converter input torque of the transmission can be calculated with an open and regulated converter clutch or also a shifting torque of the transmission. The torque is convertible to a theoretical motor actual torque.

On the basis of a transmission pattern, the same as taking inclination data into account, load data and tractional resistance data in the transmission control device can also be calculated; a motor actual torque needed for achieving a measured or derived acceleration. When the calculated motor actual torque upwardly differs by one limit value from the motor torque issued by the motor control device to the CAN databus, power-increasing contacts can, in turn, be recognized.

It is also possible from an actual rotational speed gradient of the motor adjusting itself in the operation to recognize power-increasing contacts. If, for example, in a traction downshift or in a free motor start, the measured actual rotational speed gradient is above a nominal rotational speed gradient, then power-increasing contacts on the motor or the motor control device can, in turn, be recognized.

The above described evaluations of the operation or behavior of a transmission can be used alone or combined with each other in order to recognize power-increasing contacts on the motor and/or the motor control device. Thus, for example, several or all above evaluations can flow in a decision matrix where, based on the evaluations, the probability of power-increasing contacts is determined.

The above described procedure in the evaluation of a behavior or operation of power-train side components results, as already mentioned, by the detection of power-increasing contacts in which the motor control device, despite the power increase, issues a non-increased motor nominal torque to a databus.

On the other hand, in case of a power increase on the databus, if the motor control device prepares an increased motor torque, then the motor torque issued by the motor control device is compared with a torque stored in the transmission control device according to motor operation parameters. For example, depending on a motor rotational speed and/or a motor air temperature and/or a motor air pressure, it is thus possible to store a torque in the transmission control device, which can be compared with the motor torque issued by the motor control device. In this comparison, if it is found that the motor torque issued by the motor control device upwardly deviates by a limit value from the torque stored in the transmission control device, which was determined likewise according to the motor operation parameters issued by the motor control device, then power-increasing contacts on the motor and/or the motor control device are recognized herefrom.

It concurs with this invention, that when power-increasing contacts have been detected on the motor and/or the motor control device to store the corresponding data in a non-erasable accumulator. This can be, for example, an accumulator integrated in the transmission control device. In case of failure of the transmission, it is possible by reading out this non-erasable accumulator on the part of the transmission supplier to examine whether the failure of the transmission is to be traced to power-increasing contacts on the motor or the motor control device.

For the purpose, in step 50, the corresponding data together with time data and operation data such as acceleration data and/or working hour data and/or tachometer reading data and/or rotational speed data and/or vehicle inclination data and/or temperature data and/or driving engagement data, like steering wheel locking data and accelerator pedal actuation data, where power-increasing contacts have been detected are stored in the non-erasable accumulator.

According to the invention, when power-increasing contacts have been detected, the motor control device, in step 60, can limit the actual motor torque. When the power-increasing contacts have been detected in the transmission control device, the transmission control device can parameterize the motor control device so that the actual torque of the motor is limited.

Although the implementation of the inventive method is preferred in the transmission control device, the method can obviously be implemented also in other control device which work independently of the motor control device. It is thus possible, for example, to implement the inventive method in an ABS system or an ASR system. The control device in which the inventive method is implemented must be coupled only with the motor control device, for example, via the CAN databus, so that data can be interchanged between the control devices.

The invention claimed is:

1. A method of operating drive train components of a vehicle, the method comprising the steps of:

transmitting at least one motor parameter from a control device of a motor, the motor parameter being representative of motor torque;

directing the at least one motor parameter, via a databus, to a control device of a second drive train component, the control device of the second drive train component functions independent of the control device of the motor to operate the second drive train component;

evaluating the operation of the second drive train component, which self-adjusts depending on a motor torque actually output by the motor; and identifying the presence of at least one power-increasing modification, when the motor parameter transmitted from the control device of the motor indicates an increase of the motor torque and the operation of the second drive train component fails to indicate an increase of the motor torque actually output by the motor.

2. The method according to claim 1, further comprising the steps of:

calculating the motor torque from the motor parameters transmitted by the control device of the motor on a basis of one of a pattern of the second drive train component, and a pattern of the drive train and the operation of the second drive train component, which self-adjusts depending on the motor torque actually output by the motor; and identifying the presence of the power-increasing modification when the calculated motor torque deviates upwardly by a limit value from the motor torque actually output by the motor.

3. The method according to claim 1, further comprising the step of identifying the presence of the power-increasing modification when, on a basis of the motor torque actually output by the motor, a self-adjusting, positive actual rotational speed gradient of the motor upwardly deviates by one limit value from a nominal rotational speed gradient.

4. The method according to claim 1, further comprising the step of identifying the presence of the power-increasing modification when all adaptations of control parameters of the second drive train component at least one of:

extend in one direction, lead to strong or irregular changes of the control parameters of the second drive train component, and direct the control parameters of the second drive train component to upper power range of adaptation limits.

5. The method according to claim 1, further comprising the step of identifying the presence of the power-increasing modification when regulating contacts of a control device of a further drive train, which functions independent of the control device of the motor, are above a limit value.

6. The method according to claim 1, further comprising the step of limiting the motor torque, which is actually output from the motor, with the control device of the motor when such is induced by the control device the second train component, when the presence of power-increasing modification is detected on at least one of the motor and the control device of the motor.

7. A method of operating power drive components of a motor vehicle, the method comprising the steps of:

transmitting at least one motor parameter from a motor control device, the motor parameter delineating a motor torque;

directing the at least one motor parameter, via a databus, to a control device of a third power train component, the control device of the third power train component operates independent of the motor control device to operate the third power train component;

comparing the motor torque delineated by the motor parameter, which is transmitted by the motor control device, with a torque which is stored in the control device of the third power train component that operates independent of the motor control device; and identifying the presence of at least one power-increasing modification when the motor torque delineated by the motor parameter, which is transmitted by the motor control device, exceeds the torque which is stored in the control device of the third power train component.

8. The method according to claim 7, further comprising the step of identifying the presence of the power-increasing modification when the motor torque delineated by the motor parameter, which is transmitted by the motor control device, exceeds the torque stored in the control device of the third power train component.

9. The method according to claim 7, further comprising the step of defining the torque stored in the control device of the third power train component as being dependent on at least one of:

a motor rotational speed, a motor air temperature, and a motor pressure.

10. The method according to claim 7, further comprising the step of storing corresponding data in a non-erasable accumulator when the presence of power-increasing modification on at least one of a motor and the motor control device is identified.

11. The method according to claim 10, further comprising the step identifying the presence of power-increasing modification with and storing the corresponding data in a control device of a transmission which operates independent of the motor control device.

12. The method according to claim 10, further comprising the step of reading the corresponding data, via a data interface, from outside of the motor vehicle.

* * * * *